(12) United States Patent
Pernel et al.

(10) Patent No.: US 8,695,403 B2
(45) Date of Patent: Apr. 15, 2014

(54) SUPPORT FOR A THIN ELEMENT, QUARTZ MICROBALANCE INCLUDING SUCH A SUPPORT AND A SAMPLE HOLDER INCLUDING SUCH A SUPPORT

(75) Inventors: Carole Pernel, St Egreve (FR); André Poinard, St Paul d'Izeaux (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 752 days.

(21) Appl. No.: 12/842,969

(22) Filed: Jul. 23, 2010

(65) Prior Publication Data
US 2011/0024291 A1 Feb. 3, 2011

(30) Foreign Application Priority Data
Jul. 28, 2009 (FR) ...................................... 09 55269

(51) Int. Cl.
*H01L 41/08* (2006.01)
(52) U.S. Cl.
USPC .......................................... 73/24.06; 73/850
(58) Field of Classification Search
USPC ....................................................... 73/24.06
See application file for complete search history.

(56) References Cited

U.S. PATENT DOCUMENTS

| 4,917,499 | A | * | 4/1990 | Champetier et al. ............. 374/14 |
| 6,463,789 | B2 | * | 10/2002 | Moos et al. ................... 73/31.06 |
| 6,942,782 | B2 | * | 9/2005 | Shevchenko et al. ...... 205/793.5 |
| 7,232,545 | B2 | * | 6/2007 | Centanni et al. ................... 422/3 |

FOREIGN PATENT DOCUMENTS

| GB | 2348286 A | 9/2000 |
| JP | 60004819 A | 1/1985 |
| WO | 01/63224 A1 | 8/2001 |

OTHER PUBLICATIONS

French Search Report in French Application No. FR 0955269, mailed May 31, 2010.

\* cited by examiner

*Primary Examiner* — Hezron E Williams
*Assistant Examiner* — Mark A Shabman
(74) *Attorney, Agent, or Firm* — Nixon Peabody LLP

(57) ABSTRACT

A support for a thin element in an electrically conducting or semi-conducting material, one face of which is intended to be put into contact with a liquid or gas medium, the support has a first part provided with a central through-passage with a longitudinal axis, said passage including at least one first and one second portion with a different diameter connected to each other through a shoulder, said shoulder being intended for supporting said thin element; a second part penetrating into the passage with the end opposite to the one intended to be exposed to the liquid solution, capable of maintaining the thin element on the shoulder; and a seal between the thin element and the shoulder.

20 Claims, 8 Drawing Sheets

Figure 1:
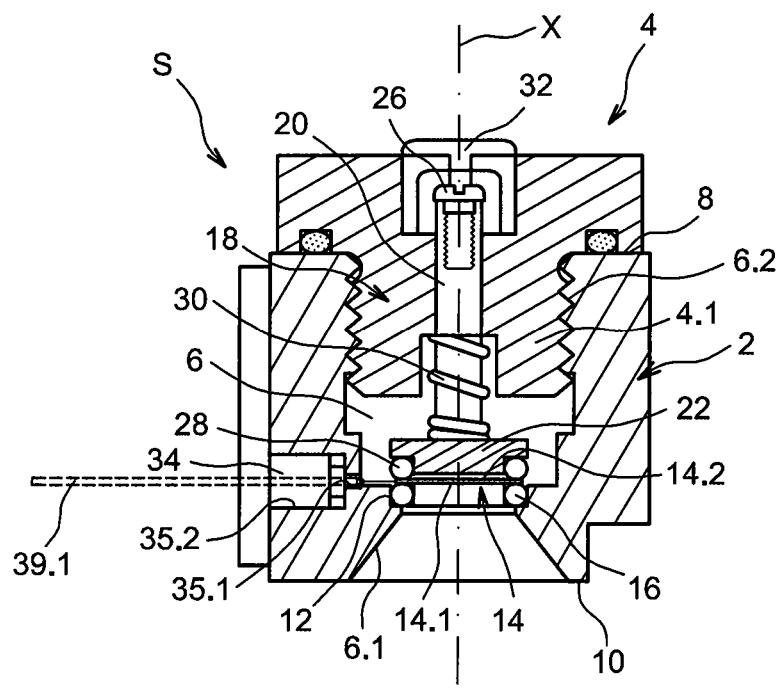

SUPPORT FOR A THIN ELEMENT, QUARTZ MICROBALANCE INCLUDING SUCH A SUPPORT AND A SAMPLE HOLDER INCLUDING SUCH A SUPPORT

CROSS REFERENCE TO RELATED APPLICATIONS OR PRIORITY CLAIM

This application claims priority of French Patent Application No. 09 55269, filed Jul. 28, 2009.

DESCRIPTION

Technical Field and Prior Art

The present invention relates to a support for a thin element, this thin element may either be a substrate on which a sample is deposited as a film, or an element allowing measurements to be conducted, such as a quartz for quartz microbalance. The present invention also relates to microbalance including such a support and to a sample holder including such a support.

Quartz microbalance allow the measurement of the mass of a material deposit of the order of a few nanograms in a gas or liquid medium by measuring the change in the resonance frequency of the quartz, quartz being a material having piezoelectric properties. For this, the quartz is covered on both of its faces with a conductive layer, such as platinum.

Such microbalance may be coupled to electrochemical systems, called electrochemical cells in which electrochemical reactions at the origin of the change in mass on the quartz strip occur.

The microbalance includes a casing in which the quartz strip is maintained. The casing is mounted on the electrochemical cell. The casing is such that a face of the strip is exposed, the electrochemical bath of the cell coming into contact with this exposed face. It is on this face that the deposition, or more generally, the electrochemical reactions occur.

The casings or supports of the quartz of microbalance of the state of the art include a large number of parts. For example, they include a large number of screws and of added supporting elements. In addition to the risk of losing one of the parts, in particular the screws, screwing and unscrewing rapidly wear out the screw threads. Rather rapidly, the assembly is no longer optimum. Moreover their seal is not optimum. In addition, replacement of the quartz is difficult and requires almost entirely disassembling the casing. Each disassembly causes deterioration of the support, as this was explained above.

Further because of their construction and of their mounting on the electrochemical cells, a large narrow cavity exists at the surface of the quartz in contact with the liquid. This cavity traps gas bubbles, which may perturb the measurements.

There also exist devices for analyzing thin films, the conducting or semiconducting thin films being deposited on a substrate. These devices have the same drawbacks as those mentioned earlier for microbalance.

Therefore an object of the present invention is to provide a support for a thin element of simple structure allowing easy handling and easy and practical replacement of the thin element.

A secondary object of the present invention is also to provide a support for a thin element reducing as far as possible the risks of trapping gas bubbles at the surface of the thin element in contact with the solution, for example quartz or sample.

DISCUSSION OF THE INVENTION

The object discussed earlier is achieved by a support including a casing provided with a shoulder against which a strip is sealably clamped, and by a clamping element applying a force to the strip in order to maintain it against the shoulder, and providing a sealed contact of the strip against the shoulder; the face of the strip, the periphery of which is in contact with the shoulder, is intended to come into contact with an active solution. The other face is found inside the casing which is sealed. The clamping element also forms the sealed obturator of the casing and cooperates with the casing by screwing.

By strip is meant a thin element which may for example be a quartz plate, the thickness of which is of the order of a few hundred micrometers, or a thin film.

Thus, dismounting and mounting of the support are very simple, since the latter only includes two parts, the screws being suppressed. Replacement of the thin element is therefore easy. So there is no longer any risk of deteriorating the support. Moreover, the seal is simply and effectively obtained by the force applied by the plug on the plate. Moreover, the support may be designed so as to make the cavity as short as possible at the surface of the plate. Therefore the support has a complete tightness at the front face and at the rear face, the support can be immersed in a liquid solution.

The subject-matter of the present invention is then mainly a support for a thin element in an electrically conducting or semiconducting material, one face of which is intended to be put into contact with a liquid or gas medium, said support including a first part provided with a central through-passage with a longitudinal axis, said passage including at least one first and one second portion with a different diameter being connected through a shoulder, said shoulder being intended to support said thin element, a second part penetrating into the passage with the end opposite to the one intended to be exposed to the liquid solution, capable of maintaining the thin element on the shoulder, the first and the second parts cooperating by screwing, a sealing means between the thin element and the shoulder.

The second part may include a first portion forming a plug and cooperating by screwing with the first part, a slidably mounted rod by one end in the first portion, a head attached to a second end of the rod and intended to exert a force on the thin element, and an elastic means reactably mounted between the head and the first portion, so as to exert said axial force on the head towards the shoulder.

The portion of the passage intended to come into contact with the liquid advantageously has a frusto-conical shape, the larger diameter of which is oriented away from the shoulder.

The sealing means between the shoulder and the thin element may be an O-ring gasket or a protruding bead of the shoulder formed with the first part in the same material.

The first and the second part are advantageously made in Teflon® (PTFE or polytetrafluoroethylene).

A seal gasket is for example provided between the first and the second part.

The first part may include a side passage opening out into the central passage at the shoulder for placing the thin element and/or letting through electric connection means.

The subject-matter of the present invention is also quartz microbalance including a support according to the present invention and a quartz plate provided with metallization on each of its faces, forming the thin element, an annular flexible element being interposed between the head and the quartz plate, in order to allow the quartz to vibrate freely.

The first part may include a flat portion on its outer periphery in the area where the side passage opens out, and a plate blocking the side passage, said plate including bored holes for letting through an electric connection.

The subject-matter of the present invention is also a sample holder including a support according to the present invention and a substrate having a plate-shape covered on one of its faces with a film to be analyzed, forming the thin element, said support including an electric contact element positioned on the shoulder and interposed between the film and the shoulder, the sealing means being located between the shoulder and the thin element.

The electric contact element is advantageously a washer, the inner periphery of which is formed by tabs, said tabs being folded so as to move away from the shoulder, allowing electric contact with the thin film.

The sample holder may include a hollow rod attached on the first part at the side passage, said rod being crossed by an electric connection to the electric contact element.

The subject-matter of the present invention is also a measurement assembly including a support according to the present invention and an electrochemical cell, on which the support is attached. The electrochemical cell including a side wall and a bottom defining a container and a side orifice in its lower portion, the support being attached on the electrochemical cell so that the portion of the passage intended to be in contact with the liquid is facing the side orifice.

The side wall of the electrochemical cell may be provided with a flat portion at the side orifice, the support directly bearing upon the flat portion so that the distance between the electrochemical bath and the face of the thin element is reduced.

The measurement assembly according to the present invention may include means for attaching the support facing the side orifice, said attachment means including an assembly of two flanges connected through tie rods maintaining the support against the electrochemical cell, a first flange bearing upon an area of the side wall of the electrochemical cell opposite to the side orifice and a second flange bearing upon the support so that the clamping force is exerted through the side wall.

The first flange may be attached on the side wall.

The support may include a protruding edge of the face surrounding the central passage, forcibly inserted into the side orifice of the electrochemical cell.

The electrochemical cell advantageously is in Teflon® (PTFE or polytetrafluoroethylene).

SHORT DESCRIPTION OF THE DRAWINGS

Figure 2:
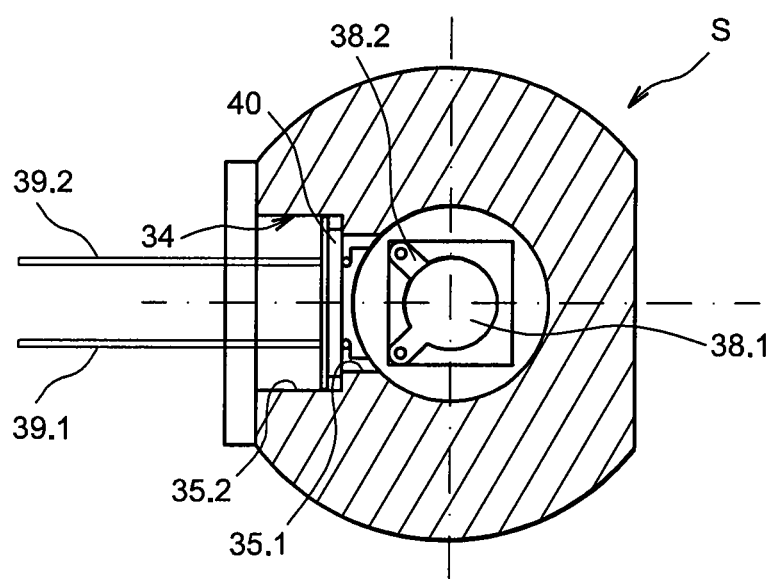
Figure 3A:
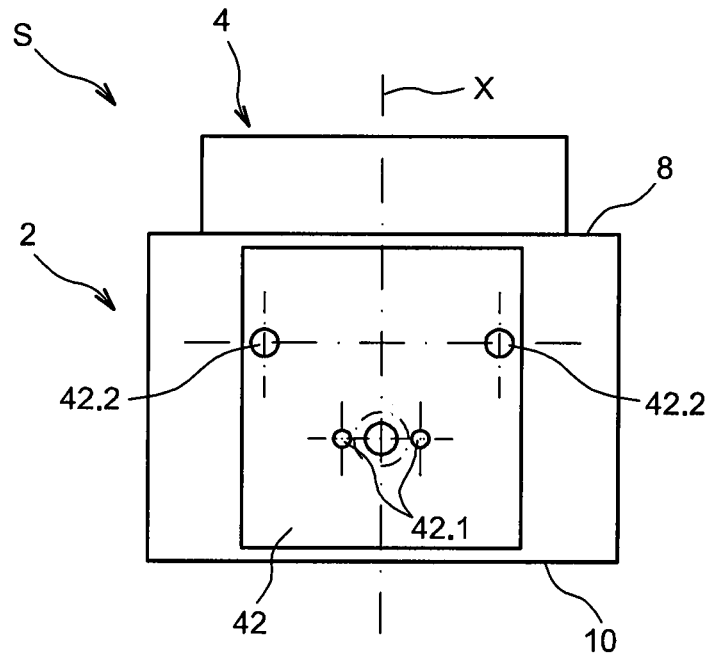
Figure 3B:
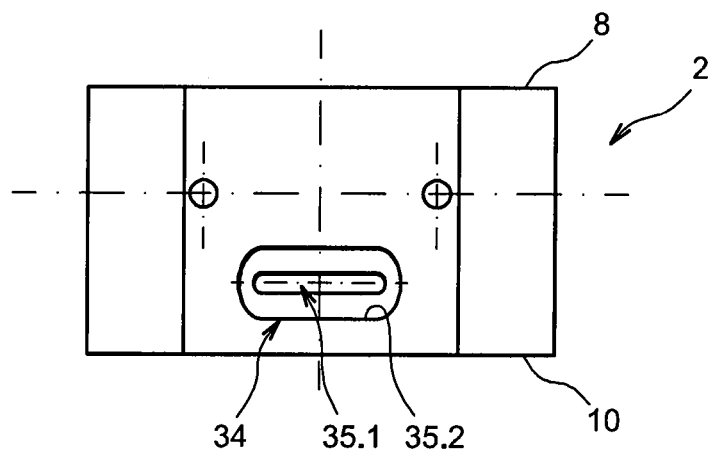
Figure 4:
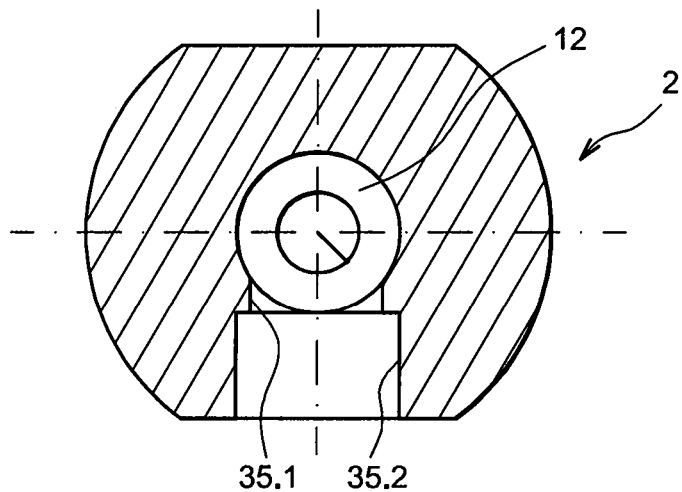
Figure 5A:
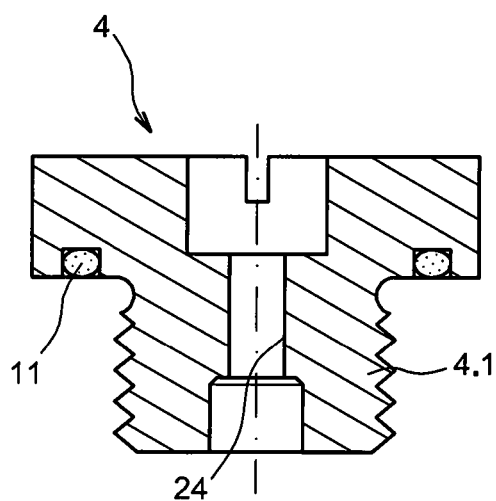
Figure 5B:
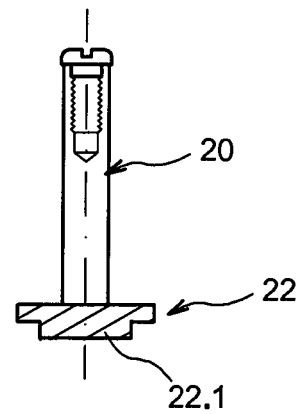
Figure 6:
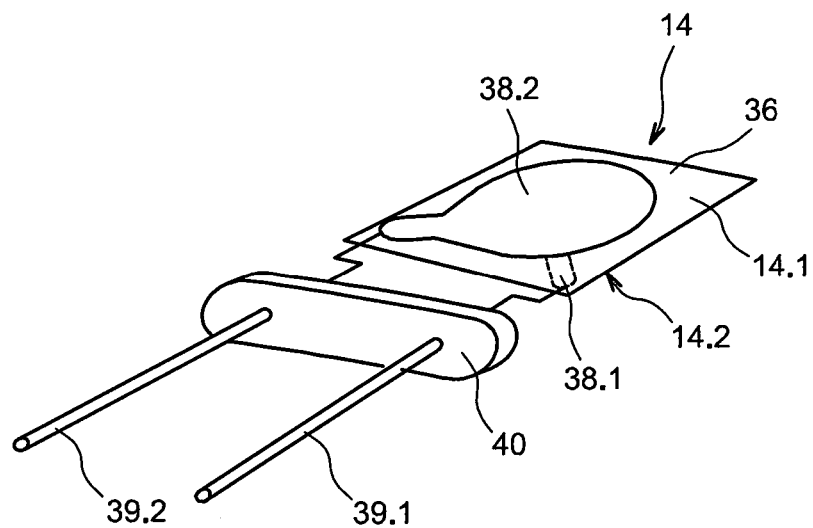
Figure 10:
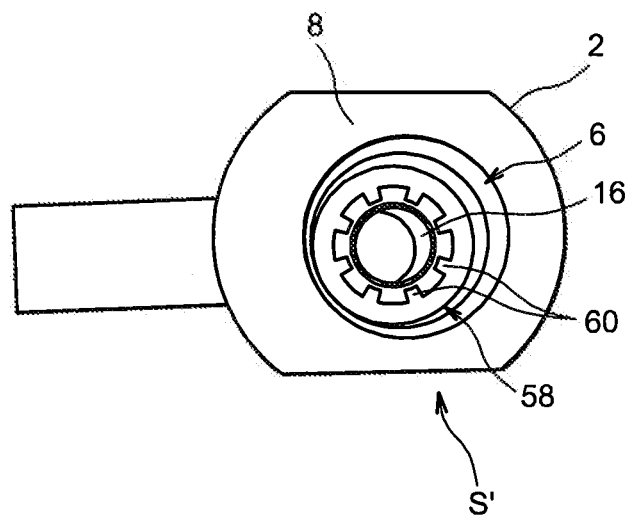
Figure 7A:
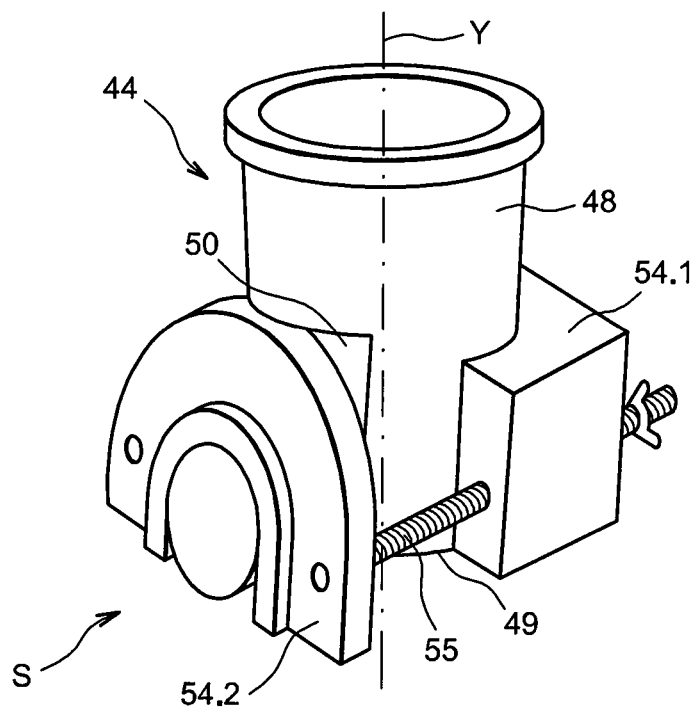
Figure 7B:
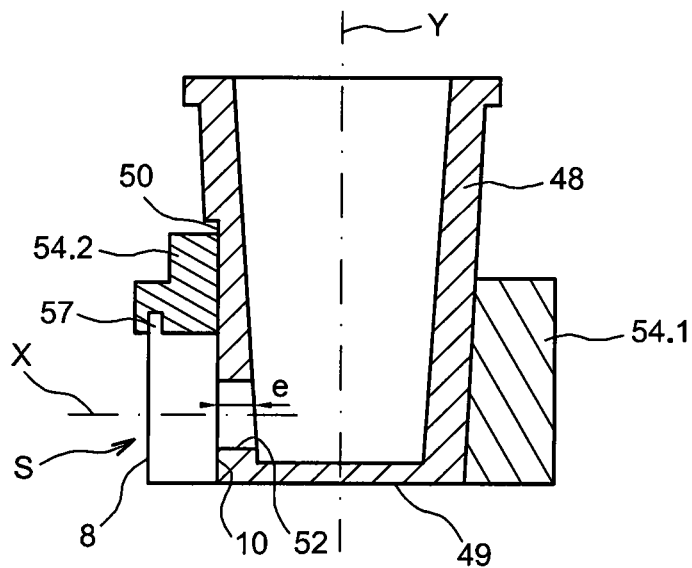
Figure 8A:
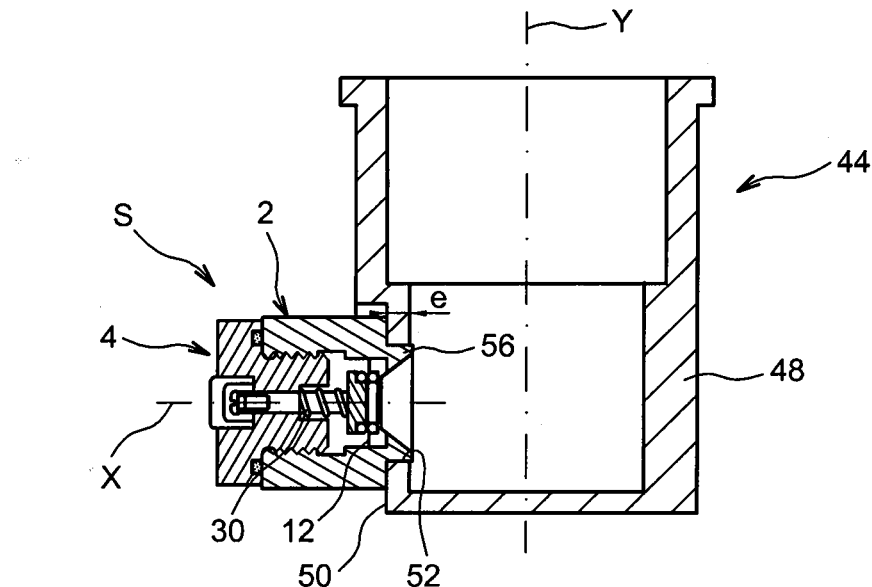
Figure 8B:
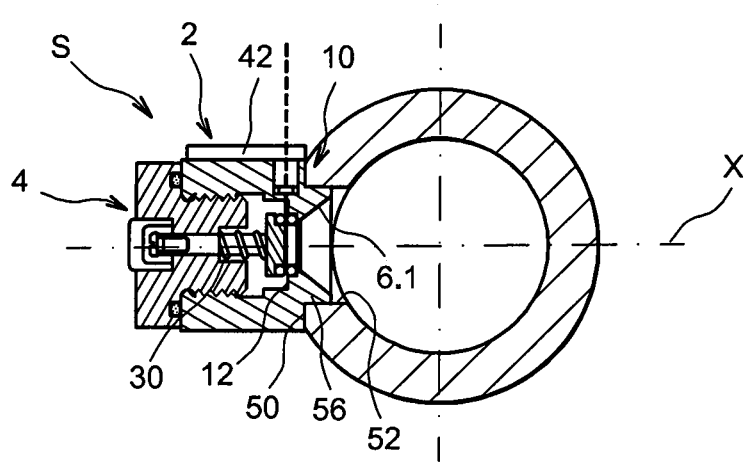
Figure 9A:
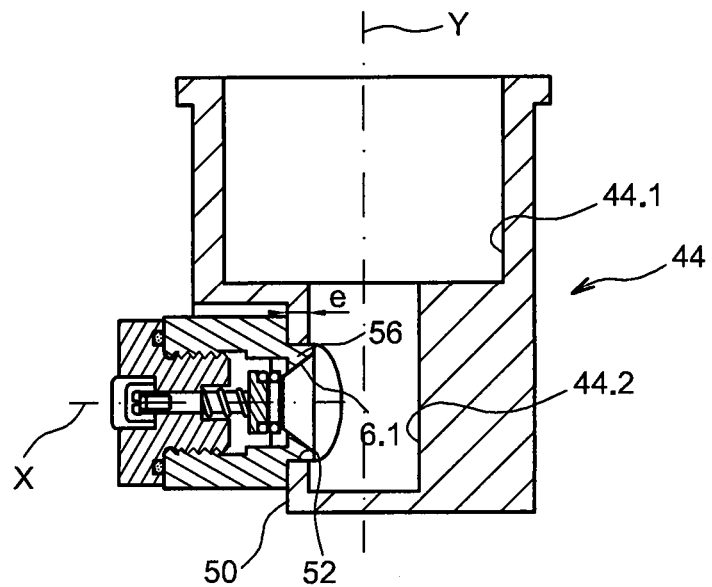
Figure 9B:
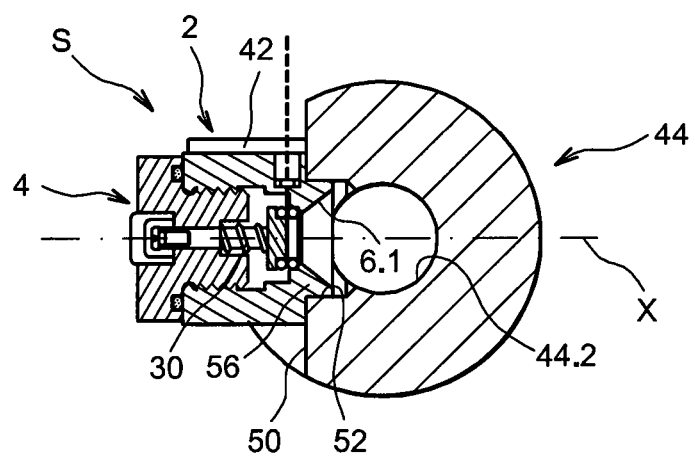
Figure 11:
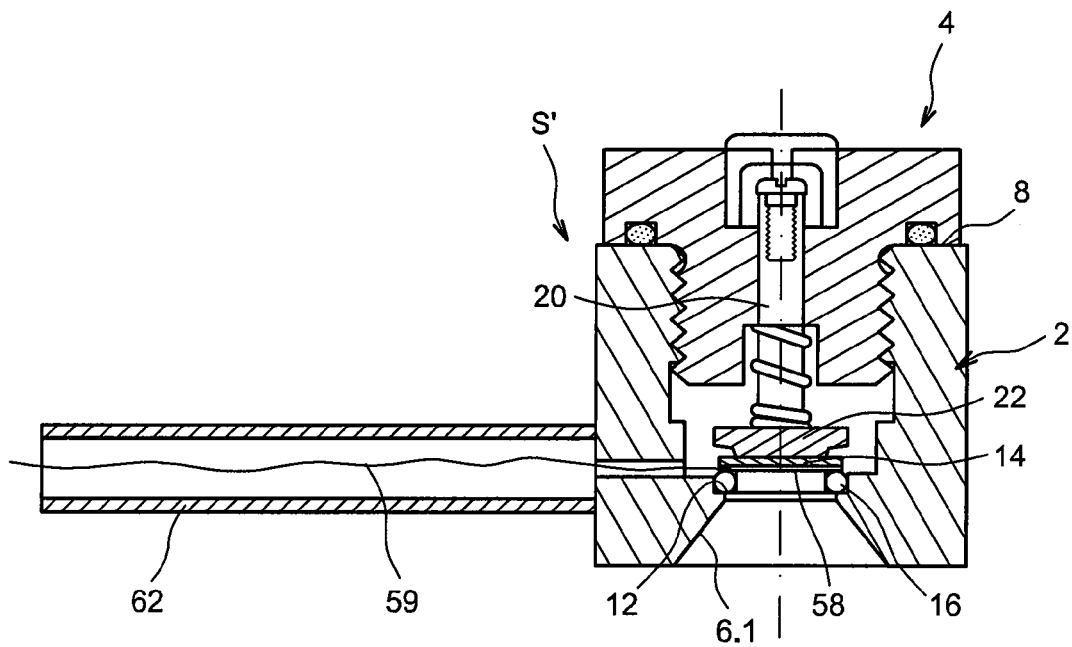
Figure 12:
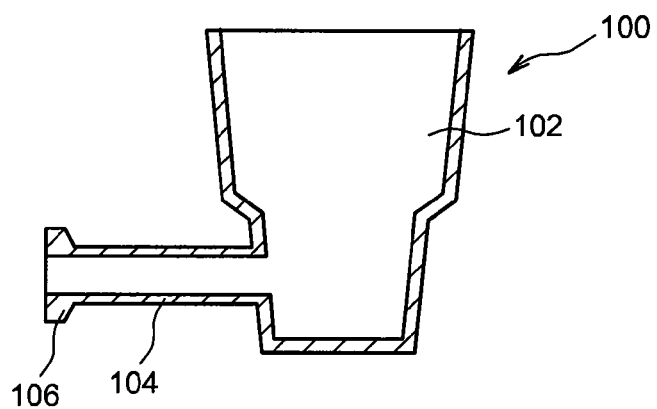

The present invention will be better understood with the description which follows and the appended drawings, wherein:

FIG. 1 is a longitudinal sectional view of an exemplary embodiment of a support according to the present invention, FIG. 2 is a transverse sectional view of the support of FIG. 1, FIG. 3A is a side view of the support of FIG. 1, FIG. 3B is a view identical with that of FIG. 3A, the quartz having been removed, FIG. 4 is a transverse sectional view of the support of FIG. 1 in the absence of the quartz, FIG. 5A is a longitudinal sectional view and FIG. 5B is a side view of elements forming holding means belonging to the support, FIG. 6 is a perspective view of a quartz element which may be used in a support according to the present invention in order to form quartz microbalance, FIGS. 7A and 7B are perspective and longitudinal sectional views respectively of an electrochemical cell according to a first embodiment capable of being used with the support according to the present invention, FIGS. 8A and 8B are longitudinal sectional and transverse sectional views respectively of an electrochemical cell capable of being used with the support according to the present invention according to a second embodiment, FIGS. 9A and 9B are longitudinal sectional and transverse sectional views respectively of an alternative of an electrochemical cell of FIGS. 8A and 8B, FIG. 10 is a perspective view of a sample holder according to the present invention, FIG. 11 is a longitudinal sectional view of a sample holder of FIG. 10, FIG. 12 is a longitudinal sectional view of an electrochemical cell of the state of the art.

DETAILED DISCUSSION OF PARTICULAR EMBODIMENTS

In FIG. 1, a longitudinal sectional view may be seen of an exemplary embodiment of a support S according to the present invention.

The support S according to the present invention may either form a support for quartz microbalance, or form a sample holder.

The support illustrated in FIGS. 1-5B is more particularly adapted for making microbalance. We shall also describe an embodiment more particularly adapted to making a sample holder.

The support S according to the invention includes a casing 2, in which the element to be supported and a device for maintaining the element to be supported are arranged. This maintenance device also forms an obturator. For purposes of simplicity, the maintenance device will be designated as a <<plug>> subsequently in the description. The casing 2 includes a through-passage 6 with a longitudinal axis X extending from a first face 8 of the casing 2 towards a second face 10 opposite to the first face 8. The second face 10 of the casing is intended to be put into contact with a liquid.

The plug 4 sealably blocks the passage on the side of the first face 8 of the casing. For this, the plug 4 is introduced into the passage 6 on the side of the first face 8. A seal gasket 11 is provided between a gasket groove of the plug and the first face 8 of the casing.

Immobilization of the plug 4 on the casing is obtained by screwing; for this, the plug 4 includes a threaded portion 4.1 and the passage 6 includes a tapped portion.

According to the present invention, the passage 6 includes a shoulder 12 forming a supporting surface for a plate 14 either intended to form a substrate for a sample to be analyzed, or to form a portion of microbalance, in the latter case, the plate 14 is for example in metallized quartz on both of its faces.

The plate 14 includes two faces; a first face 14.1 is intended to be oriented towards the shoulder 12 and to be in contact with liquid and a second face 14.2 is intended to be facing the plug 4. In the case of a quartz plate, the latter measures less than 200 μm and is covered on one face with a conductive film of the order of 300 nm. In the case of a substrate covered with the film to be analyzed, the substrate may measure of the order of 700 μm in thickness and the film may measure from a few tens of nanometers to a few hundred nanometers in thickness. In the case of a substrate of 100 mm, the film may have a thickness of 500 μm; in the case of a substrate of 200 mm, the film may have a thickness of 700 μm; and in the case of a substrate of 300 mm, the film may have a thickness of 750 μm.

The substrate may be in silicon.

Subsequently in the description, we shall exclusively designate this element as a <<plate>>.

A seal gasket 16, for example an O-ring gasket, is interposed between the face 14.1 of the plate and the shoulder 12 so as to ensure sealed contact. Thus, the passage 6 is sealably divided into two portions, a first portion 6.1 located between the shoulder 12 and the second face 10 and a second portion 6.2 located between the shoulder 12 and the first face 8. The first portion 6.1 forms a window for accessing the face 14.1 of the plate 14 for the liquid.

Advantageously, the first portion 6.1 has a length as reduced as possible in order to avoid forming a cavity promoting generation and retention of gas bubbles, while being capable of withstanding the applied clamping force on the thin element 14. Moreover, in the illustrated example, the first portion 6.1 advantageously has a frusto-conical section facilitating evacuation of the gas bubbles which may possibly appear.

The plug 4 forming a holding device includes means 18 for maintaining the plate 14 against the shoulder 12 in order to ensure the seal at the shoulder 12.

In the illustrated example, the means 18 are formed by a rod 20 (FIG. 5B) provided at a first longitudinal end with a head 22 intended to apply a force on the plate 14. The plug 4 includes a longitudinal through-bore 24 (FIG. 5A) in which the rod 20 is mounted. The rod 20 is capable of sliding in the bore 24. An axial retaining means 26 is mounted on the second longitudinal end of the rod 20 preventing the latter from escaping from the bore 24.

When the plug 4 is mounted on the casing, the head 22 is located inside the casing 2.

The actual force is generated by an elastic means 30 reactably mounted between the head 22 and the lid 4. In the illustrated example, this is a helical spring. By slidably mounting the rod 20 in the lid 4, it is possible to reduce the risks of deteriorating the plate 14. Further, with this mounting, it is possible to easily control the force applied to the plate 14. The force can be set in a manner that the tightness is ensured, whereas the quart can vibrate freely. For this, a suitable strength is just applied on the spring by adjusting the length between the head 22 and the bottom of the part 4.1 of the lid 4.

The head 22 may directly come into contact with the plate 14 or via an element interposed between the head 22 and the plate 14. For example, in the case of quartz microbalance, the quartz has to be held, however the vibrations of the quartz which allow detection of mass variations, should not be hindered. For this, an annular interposition element 28 is provided which only bears upon the outer edge of the quartz, allowing it to be held without interfering with its setting into vibration. In the illustrated example, the flexible element 28 is an O-ring gasket similar to the O-ring gasket 16, allowing the use of a reduced number of different components. In this advantageous example, the quartz is hold between the resilient elements, these resilient elements being gaskets, the quartz is then free to vibrate, it is thus possible to get very accurate measurements.

Advantageously, provision is made for the head 22 to include on its face intended to be oriented towards the plate 14 (FIG. 5B) with a central protruding portion 22.1 (FIG. 5B) with a slightly greater diameter than that of the gasket 28 allowing simple mounting and immobilization of the gasket 28 on the head 22.

In the case when the plate is in quartz for making quartz microbalance, the force exerted by the spring 30 is adapted so as to maintain the quartz applied against the O-ring gasket 16 while allowing the quartz to vibrate at its resonance frequency. For example, for a quartz surface area of 0.2 cm$^2$, the force of the spring is comprised between 2N and 3N. It is moreover easy to modify the load of the spring depending on the size of the quartz by acting on the length of the rod 20.

Advantageously, a cap 32 is provided for covering the retaining means and for ensuring the seal at the bore of the plug 4.

In the illustrated example, particularly adapted for making microbalance, the casing also includes a side passage 34 visible in FIGS. 1, 2, 3B and 4 for mounting the quartz plate 14, this passage 34 includes a first portion of smaller section 35.1 corresponding to that of the quartz plate and of the metallizations, and a second portion of larger section 35.2.

In FIGS. 1 and 2, the plate 14 may be seen in the support, resting on the shoulder 12. The quartz is introduced into the support through the passage 34.

In FIG. 6, an exemplary plate used for quartz microbalance may be seen. The plate 14 includes a quartz plate 36 provided on both of its faces with metallization 38.1, 38.2 connected to pins 39.1, 39.2 intended to be connected to an outer processing unit (not shown) and with which the resonance variations of the quartz used for determining the variation of the mass may be measured.

Advantageously, a transverse portion 40 connects both pins 39.1, 39.2, the shape of which cooperates with the shape of the portion of large section 35.2 of the side passage 34, this transverse portion 40 blocks the side passage 34.

A holding plate 42 (FIG. 3A) may be provided attached on the support on the side of the side passage 34 and immobilizing the sensor. The holding plate 42 includes two bored holes 42.1 for the pins 39.1, 39.2, two bored holes 42.2 for letting through screws for attaching the plate on the support. The casing includes corresponding bored holes for the fixing screws.

The support S is for example made in Teflon®. It may be made in any other material. Teflon® (PTFE or polytetrafluoroethylene) has the advantage of being inert towards many chemical substances which may be used during the use of the microbalance, for example inert towards hydrofluoric acid.

The support equipped with a quartz plate then forms microbalance. The microbalance according to the present invention may be used in a gas medium, for example in air, in a liquid medium, or a in a liquid medium coupled with electrochemical techniques. In the latter case, the microbalance is coupled with an electrochemical cell.

The support S forming microbalance may therefore be used with an electrochemical cell filled with chemical substances used as an electrolyte. The support according to the present invention may be used with an electrochemical cell of the state of the art. Such a cell is illustrated in FIG. 12.

The cell 100 of the state of the art includes a container 102 of a substantially cylindrical shape opened at its upper end for introducing substances forming the electrochemical bath. The cell also includes at a lower portion, a neck 104 extending laterally intended for attaching the microbalance, more particularly the support S (not shown). The electrochemical solution fills the neck 104 and comes into contact with the plate 14. The neck 104 ends with a neck ring 106 against which the support flatly bears, a seal gasket is interposed between the neck ring 106 and the quartz support S. The support S is firmly attached on the neck 104 by means of two clamping flanges (not shown) connected through threaded rods, the flanges clamping the neck ring of the neck and a neck ring of the support.

This type of cell has several drawbacks.

On the one hand, this cell is generally made in glass, it is therefore brittle, in particular at the relatively long neck. Further clamping at the neck often causes breakages of the latter. On the other hand, attaching the support on the neck is laborious. And finally, the long neck forms a cavity into which gas bubbles may be trapped and may distort the measurements.

An electrochemical cell is proposed particularly suitable for achieving the mounting of microbalance according to the present invention.

The cell 44 according to the present invention to which the support according to the present invention is attached, may be seen in FIGS. 7A and 7B.

According to the present invention, the neck is suppressed and consequently the clamping on the neck, which allows suppression of the breakage risks. For this, the cell includes at the location of the outer face, from where the neck emerged, a flat portion forming a planar supporting face for the support.

In a first embodiment, attachment is no longer carried out by clamping the neck ring of the neck but by clamping the cell body. Thus, there is no longer any risk of breaking the neck during the mounting.

A preferred exemplary embodiment of a cell according to the present invention may be seen in FIGS. 7A and 7B. The cell includes a side wall 48 and a bottom 49 forming a container for the electrochemical bath, the side wall 48 has a generally cylindrical shape with constant outer diameter. According to the invention, the side wall 48 includes a flat portion 50 at its lower portion in which a side orifice 52 is made for placing the sensor and putting it into contact with the bath. The face 10 of the support flatly bears upon the flat portion 50. A seal gasket (not shown) is interposed between the support and the cell.

Two clamping flanges are provided 54.1, 54.2 clamping the support and the body; threaded rods 55 connect both flanges 54.1, 54.2. A neck ring 57 is provided on the support S cooperating with the flange 54.2 ensuring centering of the support.

The thickness e of the side wall 48 of the cell 44 is selected to be as small as possible in order to minimize the size of the cavity which is formed by the side orifice 52. This thickness is selected to be sufficiently thick in order to withstand the compression force produced by the threaded rods by means of the flanges.

In another particularly advantageous embodiment illustrated in FIGS. 8A and 8B, the face 10 of the support S includes a protruding edge 56 surrounding the window for accessing the plate, this edge 56 is itself surrounded by a set-back planar surface. The protrusion provides slightly greater outer dimensions than the inner dimensions of the side orifice. The protrusion 56 is forcibly mounted into the side orifice 52 and the planar surface which surrounds it bears against the flat portion 50. This mounting ensures holding of the support on the cell and of the seal of the connection. This mounting advantageously avoids resorting to clamping flanges.

A clamping collet may of course be provided between the cell and the support, allowing the assembly to be made even more secure.

Of course, provision may be made for such a protrusion and clamping by means of flanges, insertion of the protrusion into the side orifice allowing temporary mounting and facilitating the placement of the flanges.

In FIGS. 9A and 9B, an exemplary embodiment of a cell may be seen in the case when small volumes are applied. The cell body has a lower portion 44.2 of small inner diameter, the depth of the flat portion 50 being adapted in order to maintain the distance between the bath and the sensor as small as possible.

The cell according to the present invention has the advantage of allowing simple mounting of the support and therefore easy making of quartz microbalance.

The electrochemical cell is advantageously made in Teflon® (PTFE or polytetrafluoroethylene), making it suitable for use with a large number of substances. Further, it is not brittle.

The use of Teflon® (PTFE or polytetrafluoroethylene) makes the making of the flat portion very easy, by machining or directly during molding.

The cell of FIGS. 7A-9B according to the present invention may be used with a quartz support of the state of the art.

As the operating principle of quartz microbalance is well-known, we shall not further detail it in the present description.

The support of FIG. 2 has the advantage of allowing rapid and easy replacement of the quartz plate. Moreover, the quartz plate requires accurate positioning which is easily obtained by means of the present invention.

Advantageously, provision may further be made for a clamping peg between both pins 39.1 and 39.2 bearing upon the transverse portion 40, in order to avoid displacing the plate when the pins 39.1, 39.2 are handled.

A support S' according to the present invention used as a sample holder may be seen in FIGS. 10 and 11. The support S' according to the present invention is particularly suitable for such an application since it provides an overall seal, i.e. at the front face, at the window and at the rear face closed by the plug. Therefore, the support according to the present invention may be entirely immersed in a solution.

In this application, the plate 14 is formed by a substrate, for example in silicon on which a film forming the sample to be analyzed is deposited. This film is electrically conducting or semiconducting material. In this case, the plate 14 is much less brittle than in the case of quartz microbalance. The plate 14 then has the shape of a chip and does not include any pins. The plate 14 is then directly introduced into the passage 6 on the side 8 of the support S' and will rest on the shoulder 12. Therefore, the support S' does not require any side passage for introducing the sample, which reduces the risks of liquid entering the sample holder. The support S' includes a passage for electric wires but the latter do not require any dismounting, the seal may therefore be easily made.

The support S' includes an electric contact 58 intended to come into contact with the sample in order to measure the charge transfers between the sample and the liquid.

The electric contact 58 is provided on the shoulder 12. Therefore, the plate rests on the electric contact 58, more particularly the sample-bearing face bears against the electric contact 58.

The electric contact is for example made by means of a copper washer connected through a conducting wire to a processing unit.

Advantageously, the electric contact 58 is formed by a washer, the inner contour of which is cut out so as to form tabs 60. The tabs 60 are slightly folded so as to form a cone frustum, thus the electric contact between the sample and the tabs is improved, thereby configured tabs 60 form a spring.

The thickness of the tabs 60 is selected depending on the force transmitted by the spring 30. The number of tabs depends on the working surface, i.e. on the surface of the working window. Only as an example, 8 tabs with a thickness of 80 µm are provided for a sample of 1 cm².

A gasket 16 is provided between the sample and the shoulder 12 in order to ensure the seal of the sample holder with regard to the solution. The gasket 16 may either be formed by an added O-ring gasket, or by a protruding bead of the shoulder 12. This latter embodiment allows simplification of the mounting, the risk of forgetting the gasket or of a faulty gasket is suppressed.

The electric contact 58 is connected to wires 59 for transmitting electric information collected at the sample-liquid interface.

In FIGS. 10 and 11, the sample holder is configured as a pole, the support extending laterally with a hollow rod 62 in which the electric wire runs. The hollow rod is sealably connected to the support S'. This pole may be directly immersed into a solution, its handling is therefore facilitated.

The device for maintaining the plate 14 is similar to the one described for the microbalance. On the other hand, the O-ring gasket 28 may be suppressed, the head 22 may directly bear upon the plate by a spherical surface allowing equal distribution of the forces on the gasket, more particularly on the substrate, since these are not the vibrations which are desirably measured in this case. Moreover, the plate is much less brittle.

This sample holder as compared with the sample holders of the state of the art, has the advantage of ensuring an electric contact directly with the sample to be analyzed, i.e. the film deposited on the substrate, which allows limitation of the information losses. On the other hand, in sample holders of the state of the art, the electric contact is accomplished on the rear face of the substrate, there is therefore a loss of information through the substrate.

The sample holder may also be used with an electrochemical cell of the state of the art or such as those described earlier and illustrated in FIGS. 7A, 7B, 8A, 8B, 9A and 9B.

It is well-understood that the support according to the present invention may be attached to a plate on which other elements would be attached.

The invention claimed is:

1. A support for a plate in an electrically conducting or semiconducting material, one face of which is intended to be put into contact with a liquid or gas medium, said support including
   a first part provided with a central through-passage with a longitudinal axis, said passage including at least one first and one second portion with a different diameter being connected together through a shoulder, said shoulder being intended to support said plate,
   a second part penetrating into the passage with the end opposite to the one intended to be exposed to the liquid or gas medium, capable of maintaining the plate on the shoulder, the first and the second part cooperating by screwing, the second part including a first portion forming a plug and cooperating by screwing with the first part, a slidably mounted rod by one end in the first portion, a head attached to a second end of the rod and intended to exert a force on the plate, and an elastic means mounted in reaction between the head and the first portion, so as to exert said axial force on the head towards the shoulder,
   a sealing means between the plate and the shoulder.

2. The support according to claim 1, wherein a portion of the passage intended to come into contact with the liquid or gas medium has a frusto-conical shape, the largest diameter of which is oriented away from the shoulder.

3. The support according to claim 1, wherein the sealing means between the shoulder and the plate is an O-ring gasket or a protruding bead of the shoulder formed with the first part in the same material.

4. The support according to claim 1, wherein annular resilient element is provided between the head and the plate.

5. The support according to claim 1, wherein the first and the second part are made in PTFE or polytetrafluroethylene.

6. The support according to claim 1, wherein a seal gasket is provided between the first and the second part.

7. The support according to claim 1, wherein the first part includes a side passage opening out into the central passage at the shoulder for placing the plate and/or letting through electric connection means.

8. Quartz microbalance including a support according to claim 1, and a quartz plate provided with metallization on each of its faces, forming the plate.

9. Quartz microbalance according to claim 8, comprising an annular resilient element provided between the head and the quartz, the quartz being held between the annular resilient element and the sealing means and being free to vibrate.

10. The quartz microbalance according to claim 8, wherein the first part includes a flat portion of its outer periphery in the area where the side passage opens out and a plate blocking the side passage, said plate including bored holes for letting through electric connections.

11. The quartz microbalance according to claim 9, wherein the first part includes a flat portion of its outer periphery in the area where the side passage opens out and a plate blocking the side passage, said plate including bored holes for letting through electric connections.

12. A sample holder including a support according to claim 1 and a substrate as a plate covered on one of its faces with a film to be analyzed forming the plate, said support including an electric contact element positioned on the shoulder and interposed between the film and the shoulder, the sealing means being located between the shoulder and the plate.

13. The sample holder according to claim 12, wherein the electric contact element is a washer, the inner periphery of which is formed by tabs, said tabs being folded so as to move away from the shoulder, allowing electric contact with the thin film.

14. The sample holder according to claim 12, including a hollow rod attached on the first part at the side passage, said rod being crossed by an electric connection to the electric contact element.

15. A measurement assembly including a support according to claim 1 and an electrochemical cell, on which the support is attached, the electrochemical cell including a side wall and a bottom defining a container and a side orifice in its lower portion, the support being attached on the electrochemical cell so that the portion of the passage intended to be in contact with the liquid is facing the side orifice.

16. The measurement assembly according to claim 15, in the side wall of the electrochemical cell is provided with a flat portion at the side orifice, the support directly bearing upon the flat portion so that the distance between the electrochemical bath and the face of the plate is reduced.

17. The measurement assembly according to claim 16, including means for attaching the support facing the side orifice, said attachment means including an assembly of two flanges connected through tie rods maintaining the support against the electrochemical cell, a first flange bearing upon an area of the side wall of the electrochemical cell opposite to the side orifice and a second flange bearing upon the support so that the clamping force is exerted through the side wall.

18. The measurement assembly according to claim 17, wherein the first flange is attached on the side wall.

19. The measurement assembly according to claim 15, wherein the support includes a protruding edge of the face surrounding the central passage, forcibly inserted into the side orifice of the electrochemical cell.

20. The measurement assembly according to claim 15, wherein the electrochemical cell is in Teflon®.

* * * * *